US010996321B2

(12) United States Patent
Lee et al.

(10) Patent No.: US 10,996,321 B2
(45) Date of Patent: May 4, 2021

(54) LIGHT DETECTION AND RANGING DEVICE

(71) Applicant: LG INNOTEK CO., LTD., Seoul (KR)

(72) Inventors: Chang Hyuck Lee, Seoul (KR); Young Seop Moon, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 610 days.

(21) Appl. No.: 15/749,907

(22) PCT Filed: Aug. 3, 2016

(86) PCT No.: PCT/KR2016/008541
§ 371 (c)(1),
(2) Date: Feb. 2, 2018

(87) PCT Pub. No.: WO2017/023106
PCT Pub. Date: Feb. 9, 2017

(65) Prior Publication Data
US 2018/0231642 A1    Aug. 16, 2018

(30) Foreign Application Priority Data

Aug. 3, 2015  (KR) ........................ 10-2015-0109454

(51) Int. Cl.
*G01C 3/08* (2006.01)
*G01S 7/481* (2006.01)
(Continued)

(52) U.S. Cl.
CPC .......... *G01S 7/4817* (2013.01); *G01S 7/4812* (2013.01); *G01S 7/4814* (2013.01); *G01S 7/4815* (2013.01);
(Continued)

(58) Field of Classification Search
CPC .... G01S 7/4817; G01S 7/4814; G01S 7/4876; G01S 7/4812; G01S 7/4815; G01S 17/42;
(Continued)

(56) References Cited

U.S. PATENT DOCUMENTS 6,997,558 B2    2/2006 Perlin et al.
8,235,528 B2    8/2012 Mukai et al.
(Continued)

FOREIGN PATENT DOCUMENTS

KR    10-2011-0008379 A    1/2011
KR       10-1465787 B1    12/2014
(Continued)

*Primary Examiner* — Mark Hellner
(74) *Attorney, Agent, or Firm* — Birch, Stewart, Kolasch & Birch, LLP

(57) ABSTRACT

An optical device provided by the present invention can comprise: a light transmitting unit for generating a first beam for photographing a certain area; a light receiving unit for sensing a second beam returning from the certain area; a light separating unit for distinguishing and transmitting the first beam from the second beam; and a detection unit including a micro electro-mechanical system mirror (MEMS mirror) for transmitting the first beam by changing an optical axis up to a first steering angle, and for receiving the second beam.

20 Claims, 7 Drawing Sheets

(51) Int. Cl.
- *G01S 17/89* (2020.01)
- *G02B 27/30* (2006.01)
- *G02B 3/00* (2006.01)
- *G02B 27/10* (2006.01)
- *G01S 17/42* (2006.01)
- *G01S 17/10* (2020.01)
- *G01S 7/487* (2006.01)
- *G02B 26/08* (2006.01)
- *G02B 27/00* (2006.01)
- *G02B 27/12* (2006.01)

(52) U.S. Cl.
CPC ............ *G01S 7/4876* (2013.01); *G01S 17/10* (2013.01); *G01S 17/42* (2013.01); *G01S 17/89* (2013.01); *G02B 3/00* (2013.01); *G02B 26/0833* (2013.01); *G02B 27/0087* (2013.01); *G02B 27/10* (2013.01); *G02B 27/126* (2013.01); *G02B 27/30* (2013.01)

(58) Field of Classification Search
CPC ....... G01S 17/10; G01S 17/89; G02B 27/126; G02B 27/30; G02B 27/0087; G02B 27/10; G02B 26/0833; G02B 3/00
See application file for complete search history.

(56) References Cited

U.S. PATENT DOCUMENTS

| | | | |
|---|---|---|---|
| 8,902,409 B2 | 12/2014 | Sigmund et al. | |
| 9,857,472 B2* | 1/2018 | Mheen | G01S 17/87 |
| 2006/0227316 A1* | 10/2006 | Gatt | G01S 7/4811 |
| | | | 356/5.09 |
| 2016/0011311 A1* | 1/2016 | Mushimoto | G01S 7/4817 |
| | | | 250/236 |

FOREIGN PATENT DOCUMENTS

| | | |
|---|---|---|
| KR | 10-2015-0054024 A | 5/2015 |
| KR | 10-2015-0068545 A | 6/2015 |

* cited by examiner

LIGHT DETECTION AND RANGING DEVICE

CROSS REFERENCE TO RELATED APPLICATIONS

This application is the National Phase of PCT International Application No. PCT/KR2016/008541, filed on Aug. 3, 2016, which claims priority under 35 U.S.C. 119(a) to Patent Application No. 10-2015-0109454, filed in the Republic of Korea on Aug. 3, 2015, all of which are hereby expressly incorporated by reference into the present application.

TECHNICAL FIELD

The present invention relates to an optical device which can be used in a remote sensing system, and more specifically, a detection/measurement device for acquiring information about an object using radio waves or light.

BACKGROUND ART

Optical devices have used RaDAR (Radio Detection And Ranging) using radio waves, LaDAR (Laser Detection And Ranging) using laser beams, LiDAR (Light Detection And Ranging) using beams having shorter wavelengths than LaDAR, etc. Among these techniques, LiDAR (Light Detection And Ranging) radiates laser pulses to the surface of an object to be photographed and a detection range using a beam (laser) having a short wavelength corresponding to infrared light and an electromagnetic spectrum and then measures attributes of the object using pulses of a signal in response to the laser pulses. LiDAR has been used in archeology, geography, geology, aeronomy and remote sensing. Furthermore, combination of LiDAR, rapidly popularized smart media devices such as smartphones and tablet PCs, and rapidly developing mobile communication network technology satisfies personal demands of people and can be applied to transportation, hydrology, forestry, virtual tour, construction, etc.

FIG. 1 illustrates a general light detection and ranging device 10.

As shown, the general light detection and ranging device 10 emits beams generated from a plurality of light sources (not shown) to an object in multiple directions using a motor (not shown) and receives reflected light using a detector.

Here, the part that emits a plurality of beams 12 is mechanically moved in an arrow direction 20 according to the motor, and thus various restrictions are imposed on the light detection and ranging device. That is, it is difficult to secure mechanical reliability of the motor part and there is a limitation in reducing the size of the light detection and ranging device 10 because the motor is used. Furthermore, a plurality of light sources and a detector are required in order to extend a measurement range in the vertical direction. Moreover, the efficiency of the general light detection and ranging device may be deteriorated because a light-receiving unit thereof requires a condensing lens, and there is a limitation in acquiring various types of information because the device can obtain only distance information of an object.

DISCLOSURE

Technical Problem

The present invention can reduce the size of an optical device using a transmission lens and a beam steering device and easily control a steering angle of a beam by steering a beam using a MEMS (Micro Electro Mechanical System) mirror.

In addition, the present invention can increase a control range of a steering angle of a beam through an optical device using a lens operating in connection with a MEMS mirror.

Furthermore, the present invention can disperse light through an optical phase array capable of controlling the phase of light and transmit the dispersed light to increase light reception efficiency.

In addition, the present invention can increase emission efficiency by providing a collimation lens in a light transmission device.

Furthermore, the present invention can reduce noise and improve accuracy using a plurality of filters for a beam splitter or a beam sensing device.

Moreover, the present invention can improve accuracy with respect to a measurement range of an optical device using a plurality of mirrors which can operate in connection with a rotatable MEMS mirror.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

An optical device according to one embodiment of the present invention may include a beam transmission unit for generating a first beam for photographing a certain area; a beam reception unit for sensing a second beam returning from the certain area; a beam splitting unit for separately transmitting the first beam and the second beam; and a detection unit including a micro electro-mechanical system (MEMS) mirror for changing the optical axis of the first beam by a first steering angle, transmitting the first beam having the changed optical axis and receiving the second beam.

The optical device may further include a quarter-wave plate (QWP) positioned between the beam splitting unit and the detection unit to prevent scattering of the first beam and the second beam.

The light separating unit may include an aperture formed at the center of the light separating unit to pass the first beam therethrough and a reflecting part provided at the edge of the light separating unit to reflect the second beam.

The size of the aperture may be greater than the size of a beam spot of the first beam, the aperture may pass at least 50% of the first beam therethrough, and the reflecting part may be three or four times larger than the MEMS mirror.

The light separating unit may include a prism for reflecting the first beam and the second beam at different reference surfaces and transferring the reflected first and second beams to the detection unit and the beam reception unit.

The prism may include: a first reflecting surface for reflecting the first beam and transmitting the second beam; an absorbing surface for absorbing some of the first beam passed through the first reflecting surface; a second reflecting surface for reflecting the second beam passed through the first reflecting surface; and a penetration surface for transmitting the second beam reflected by the second reflecting surface.

The optical device may include at least one reflector positioned between the beam transmission unit, the beam reception unit, the beam splitting unit and the detection unit and transfers the first beam or the second beam.

The beam transmission unit may include a collimation lens for collimating the first beam transferred from a light source device and an optical phase array for dispersing the collimated first beam to generate the first beam.

The first beam may be a laser having a wave front diameter or major axis length in the range of 100 nm to 2 mm.

The optical phase array may be composed of elements in an m×n matrix (m and n being natural numbers equal to or greater than 3, m×n≥k), the elements being distributed in the form of a discrete space with respect to a plurality of direction vectors.

When the elements have a spherical surface, the absolute value of the curvature of the spherical surface may greater than 10 mm, and when the elements have an uneven surface, the height of the unevenness may be less than 1 mm.

The elements may have a size of more than 1.5 times the wave surface of the first beam and a refractive index in the range of 1 to 2.7.

The value obtained by dividing the size of the beam spot of a beam output from the elements by a beam spot spacing may be equal to or less than 0.5.

The optical device may further include a controller for rotating the MEMS mirror to adjust the first steering angle.

An optical device according to another embodiment of the present invention may include: a beam transmission unit for generating a first beam for photographing a certain area; a beam reception unit for sensing a second beam returning from the certain area; a beam splitting unit for separately transmitting the first beam and the second beam; a detection unit including a MEMS mirror for changing the optical axis of the first beam by a first steering angle, transmitting the first beam having the changed optical axis and receiving the second beam; and a filter unit for removing noise of the second beam transferred from the beam splitting unit and transferring the second beam to the beam reception unit.

The filter unit may include at least one of: a lens filter for selectively absorbing a predetermined wavelength region of the second beam to change the spectral distribution of the second beam and transferring the second beam; a reflection filter for selectively reflecting the predetermined wavelength region of the second beam; and a penetration filter for selectively transmitting the predetermined wavelength region of the second beam.

The lens filter, the reflection filter and the penetration filter may include a plurality of thin films.

An optical device according to another embodiment of the present invention may include: a beam transmission unit for generating a first beam for photographing a certain area; a beam reception unit for sensing a second beam returning from the certain area; a beam splitting unit for separately transmitting the first beam and the second beam; a detection unit including a MEMS mirror for changing the optical axis of the first beam by a first steering angle, transmitting the first beam having the changed optical axis and receiving the second beam; and a lens unit including one or more lenses or a combination of one or more lenses and a mirror and readjusting the steering angle in the range of 0 to ±100.

The optical device may further include an aperture positioned between the lenses, wherein the lenses have a size of more than twice a beam spot of a third beam, and the aperture has a size of more than 0.5 times the beam spot.

The value obtained by dividing an incidence angle of the lens unit by a refraction angle of the lens unit on the basis of the optical axis of the third beam may be in the range of 0.1 to 100.

The aforementioned aspects of the present invention are merely parts of preferred embodiments of the present invention and various embodiments reflecting technical features of the present invention can be derived and understood by those skilled in the art on the basis of the following detailed description of the present invention.

Advantageous Effects

It is possible to precisely control an optical device while removing a control device (e.g., a motor) required for beam steering from the optical device using a laser or reducing the size of the optical device to improve mechanical reliability.

In addition, it is possible to simplify the internal structure of the optical device using a laser to reduce manufacturing costs thereof.

Furthermore, it is possible to reduce load applied to data and signal processing to increase the operating speed of the optical device because a specific area can be scanned using a single laser.

Moreover, it is possible to improve accuracy of the optical device because elements such as a filter capable of increasing the accuracy can be additionally included in the optical device due to simplification of the structure of the optical device.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Hereinafter, devices and various methods to which embodiments of the present invention are applied will be described in detail with reference to the drawings. The terms "module" and "unit" used to signify components are used herein to aid in understanding of the components and thus they should not be considered as having specific meanings or roles.

In the following description of the embodiments, it will be understood that, when an element is referred to as being "on" or "under" another element, it can be directly on or under another element or can be indirectly formed such that an intervening element is also present. In addition, it will be understood that this expression is intended to encompass different orientations of the elements in addition to the orientation depicted in the figures, namely, to encompass both "on" and "under".

Figure 1:
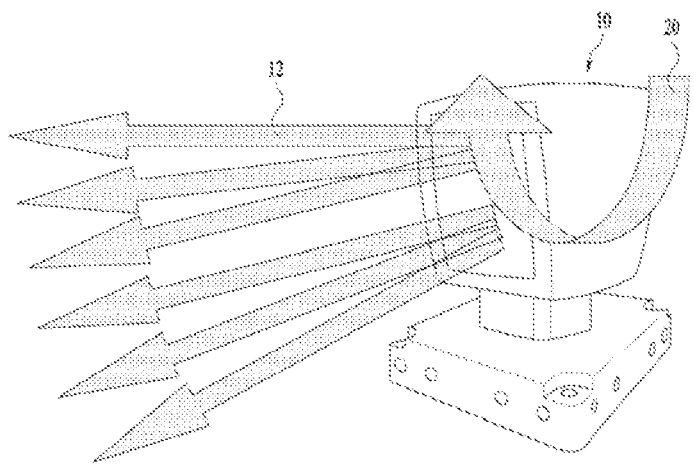
FIG. 1 illustrates a general light detection and ranging device.
Figure 2:
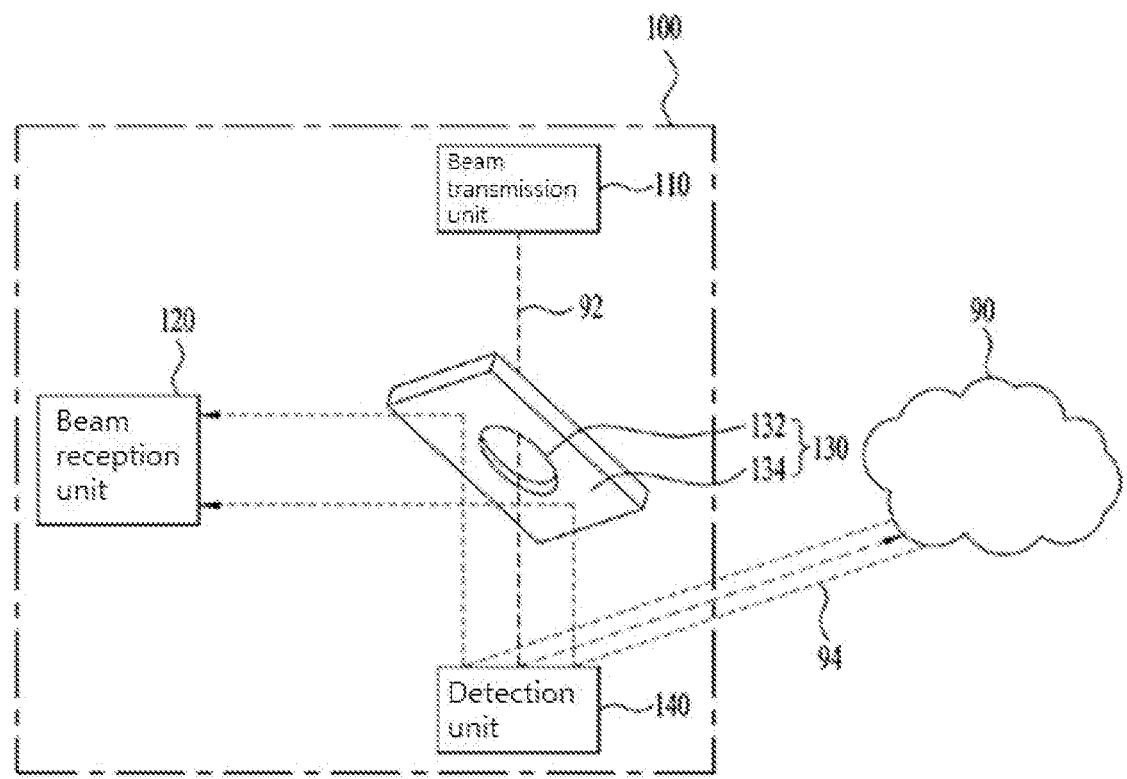
FIG. 2 illustrates a first optical device capable of performing detection and ranging using a laser.

FIG. 2 illustrates a first optical device 100 capable of performing detection and ranging using a laser.

As shown, the first optical device 100 may include a beam transmission unit 110 which generates a first beam 92 for photographing a specific region 90 (a target such as an area or an object), a beam reception unit 120 which senses a second beam 94 reflected from the specific region 90, a beam splitting unit 130 for separately transferring the first beam 92 and the second beam 94, and a detection unit 140 including a MEMS mirror which changes the optical axis of the first beam 92 by a first steering angle, transmits the first beam 92 and receives the second beam 94.

The beam splitting unit 130 may include an aperture 132 for passing the first beam 92 therethrough, which is formed at the center of the beam splitting unit, and a reflecting part 134 for reflecting the second beam 94, which is arranged around the aperture. Specifically, the size of the aperture 132 is greater than the size of a beam spot of the first beam 92 and the aperture 132 can pass at least 50% of the first beam 92 therethrough. When the quantity of the first beam 92 passing through the aperture 132 is small (less than 50%), the emission efficiency of the optical device 100 decreases. The reflecting part 134 may three or four times larger than the MEMS mirror included in the detection unit 140.

Although not shown, the beam reception unit 120 may include a sensor for sensing the second beam 94 and a data processor for processing information (images and the like) on the basis of a sensed signal.

Figure 3:
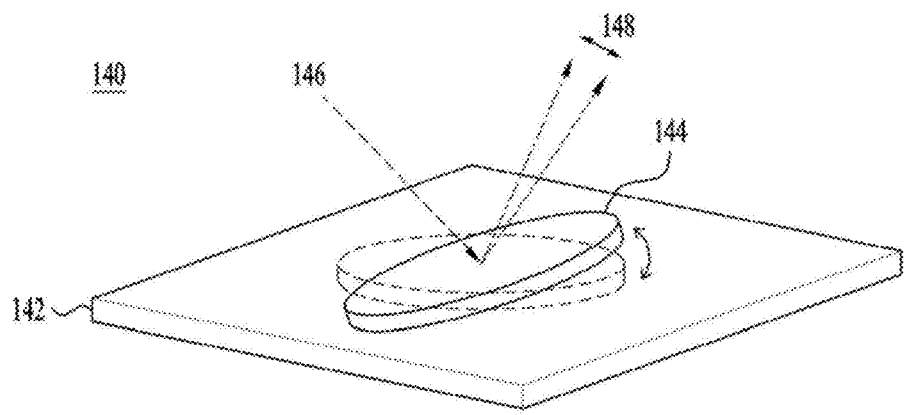
FIG. 3 illustrates a MEMS mirror included in a detection unit shown in FIG. 2.

FIG. 3 illustrates the MEMS mirror included in the detection unit 140 shown in FIG. 2.

As shown, the MEMS mirror includes a fixed part 142 and a rotatable reflecting part 144. The reflecting part 144 of the MEMS mirror is movable and thus can change the optical axis of a reflected beam 148 of a beam 146 input to the MEMS mirror in a fixed direction by a first steering angle.

The optical device 100 may further include a controller (not shown) for rotating the reflecting part 144 of the MEMS mirror to adjust the first steering angle. The MEMS mirror can reduce the size of the optical device and improve beam steering of the optical device through fine adjustment of the reflecting part 144.

Figure 4:
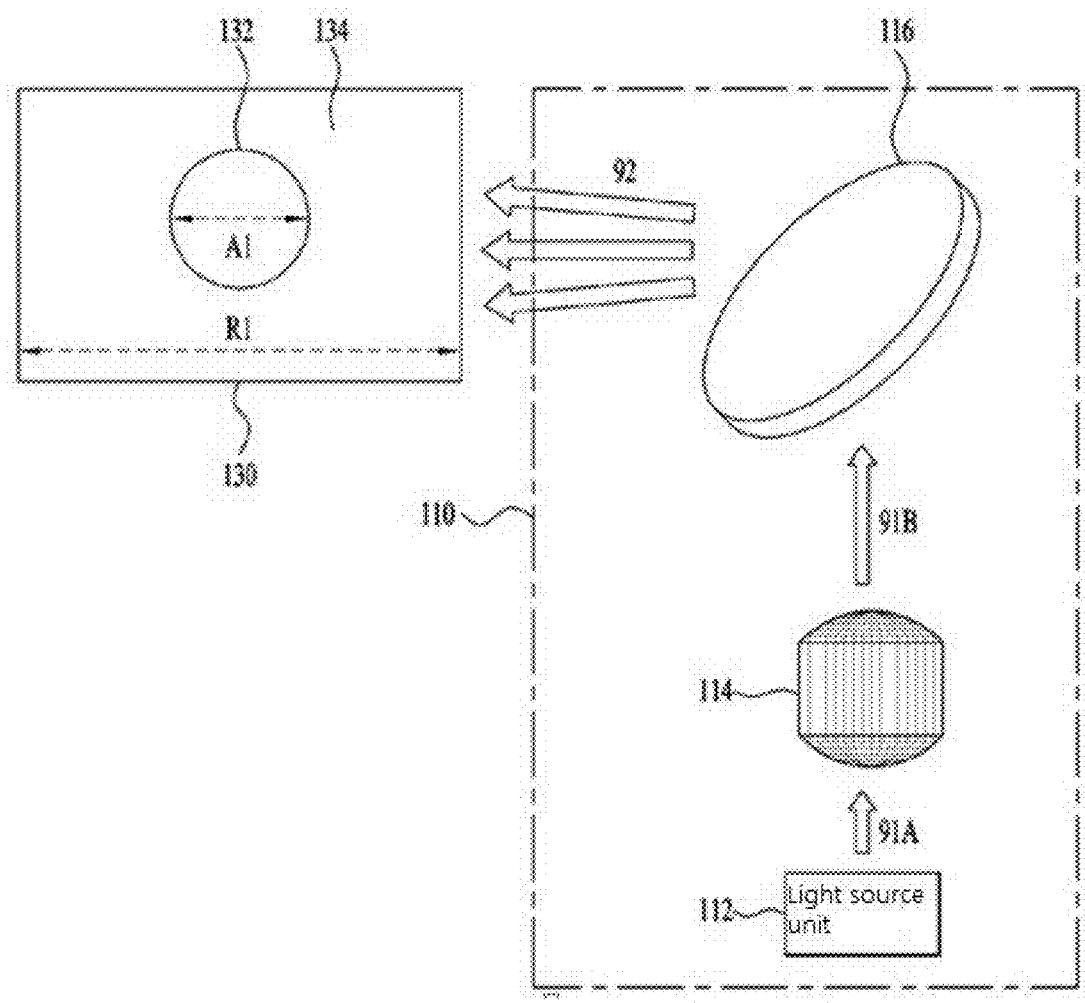
FIG. 4 illustrates a beam splitter and a beam transmitter shown in FIG. 2.

FIG. 4 illustrates the beam splitting unit 130 and the beam transmission unit 110.

As shown, when the active area of the MEMS mirror has a diameter of approximately 6 mm, the aperture 132 of the beam splitter may have a diameter A1 in the range of 3 to 4 mm and the reflecting part 134 may have a horizontal/vertical length R1 of 18 mm. In addition, the reflecting part 134 may have surface roughness of $\lambda/100$ and may include a plurality of thin films (e.g., 20 thin films).

The beam transmission unit 110 may include a collimation lens 114 for collimating the first beam 91A transferred from a light source device 112, and an optical phase array 116 for dispersing the collimated first beam 91B to generate a plurality of first beams 92. The beam transmission unit 110 may not include the separate light source device 112 and may operate in connection with light source devices of other apparatuses or equipment. Here, the first beam 91A may be a laser having a wave front diameter or major axis length in the range of 100 nm to 2 mm.

The optical phase array 116 may be composed of elements in an m×n matrix. Here, m and n may be natural numbers equal to or greater than 3 and the product m×n of m and n may be equal to or greater than k. The elements included in the optical phase array 116 may be distributed in the form of a discrete space with respect to a plurality of direction vectors.

The optical phase array 116 is discriminated from a general beam splitter. While both the optical phase array 116 and the beam splitter generate a plurality of beams from a single beam in common, the beam splitter is characterized by splitting a single beam into a plurality of beams using different reflectivities/refractive indexes. Accordingly, the wave front of an incident beam can be split into as many beams as the number of emitted beams when the beam splitter is used. For example, when the size of the wave front of an incident beam is 1 and the number of emitted beams is 9, the size of the wave front of a beam output from the beam splitter can be ⅑ that of the incident beam.

The wave front of the first beam 92 output from the optical phase array 116 may be wider than the area obtained by dividing the area of the wave front of the collimated first beam 91B by k (the number of first beams). Here, the wave front of the first beam 92 may correspond to lower than 50% of the wave front of the collimated first beam 91B. The optical phase array 116 generates a plurality of beams through phase control instead of dividing the wave front of the incident beam. Accordingly, the wave front of a beam output from the optical phase array 116 may have a size in the range of 1/k to ½ that of the incident beam and the density of the beam may decrease.

The optical phase array 116 may include a plurality of elements arranged in the form of an m×n matrix. For example, each element included in the optical phase array 116 can have a spherical surface, and the absolute value of the curvature of the spherical surface may be greater than 10 mm.

Furthermore, each element included in the optical phase array 116 may have an uneven surface. Here, the height of the unevenness may be less than 1 mm.

In addition, each element included in the optical phase array 116 may have a size of more than 1.5 times the wave surface of the collimated first beam 91B. Further, each element may have a refractive index in the range of 1 to 2.7. The value obtained by dividing the size of the beam spot of a beam output from the elements included in the optical phase array 116 by beam spot spacing may be equal to or less than 0.5.

Further, the optical phase array 116 may be a transmissive or reflective element.

Figure 5:
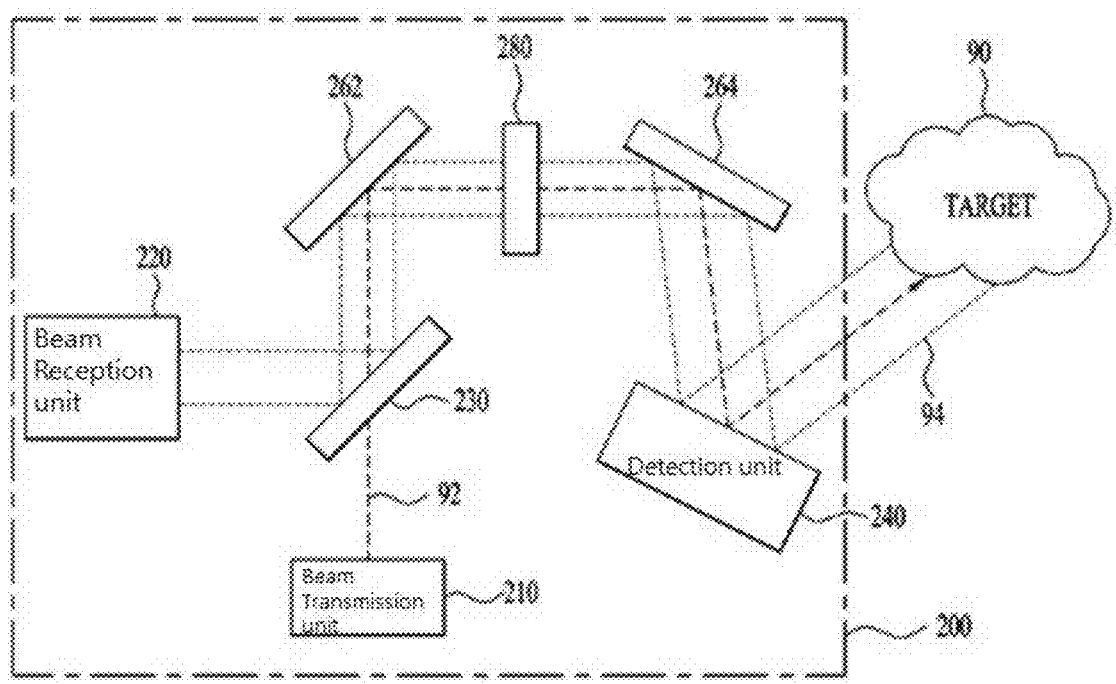
FIG. 5 illustrates a second optical device capable of performing detection and ranging using a laser.

FIG. 5 illustrates a second optical device 200 capable of performing detection and ranging using a laser.

As shown, the second optical device 200 may include a beam transmission unit 210 which generates a first beam 92 for photographing a specific region 90 (a target such as an area or an object), a beam reception unit 220 which senses a second beam 94 reflected from the specific region 90, a beam splitting unit 230 for separately transferring the first beam 92 and the second beam 94, and a detection unit 240 including a MEMS mirror which changes the optical axis of the first beam 92 by a first steering angle, transmits the first beam 92 and receives the second beam 94. The beam splitting unit 230 may include a beam splitter which transmits the first beam 92 and reflects the second beam 94.

The second optical device 200 may further include a quarter-wave plate (QWP) 280 which is positioned between the beam splitting unit 230 and the detection unit 240 to prevent scattering of the first beam and the second beam.

In addition, the second optical device 200 may further include at least one reflector 262 and 264 which is positioned between the beam transmission unit 210, beam reception unit 220 and beam splitting unit 230, and the detection unit 240 to transfer the first beam 92 or the second beam 94. The number and positions of reflectors 262 and 264 may depend on the internal design of the second optical device 200 and the reflectors may include mirror type elements.

Figure 6:
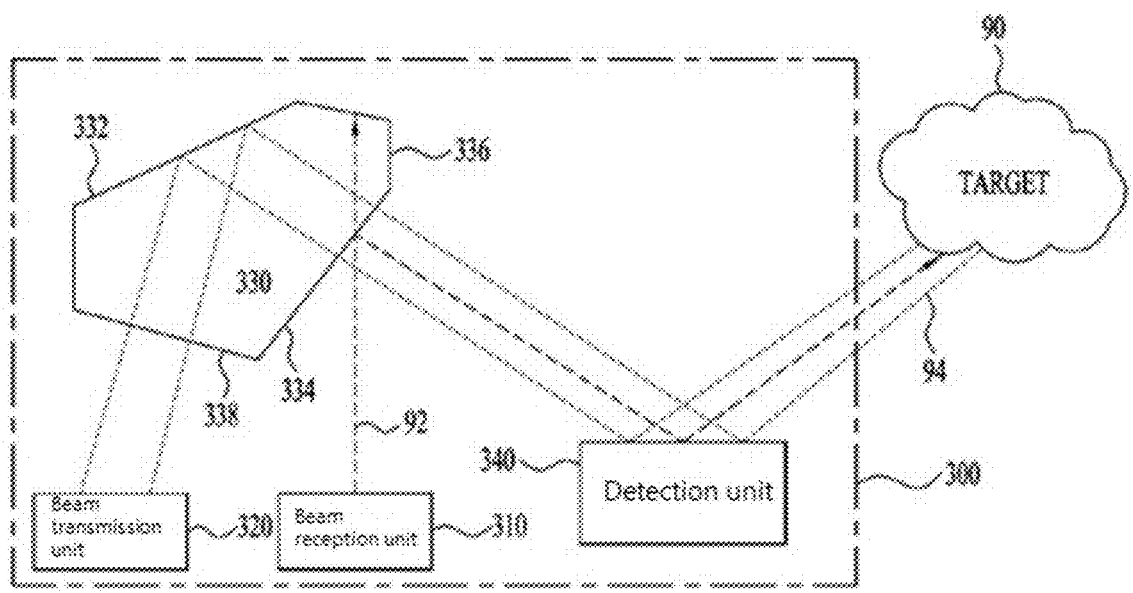
FIG. 6 illustrates a third optical device capable of performing detection and ranging using a laser.

FIG. 6 illustrates a third optical device 300 capable of performing detection and ranging using a laser.

As shown, the third optical device 300 may include a beam transmission unit 310 which generates a first beam 92 for photographing a specific region 90 (a target such as an area or an object), a beam reception unit 320 which senses a second beam 94 reflected from the specific region 90, a beam splitting unit 330 for separately transferring the first beam 92 and the second beam 94, and a detection unit 340 including a MEMS mirror which changes the optical axis of the first beam 92 by a first steering angle, transmits the first beam 92 and receives the second beam 94.

The beam splitting unit 330 may include a prism which reflects the first beam 92 and the second beam 94 at different reference surfaces and transfers the reflected beams to the detection unit 340 and the beam reception unit 320.

The prism in the beam splitting unit 330 may include a first reflecting surface 334 which reflects the first beam 92 and transmits the second beam, an absorbing surface 336 for absorbing some of the first beam 92 which has not been reflected by and passed through the first reflecting surface 334, a second reflecting surface 332 which reflects the second beam 94 which has passed through the first reflecting surface 334, and a penetration surface 338 which transmits the second beam 94 reflected by the second reflecting surface 332.

The first reflecting surface 334 may be formed such that it can reflect at least 50% of the first beam 92. When the reflectivity of the first reflecting surface 334 is low, the emission efficiency of the first beam 92 in the third optical device 300 decreases.

Furthermore, the prism in the beam splitting unit 330 has various functions and thus the surfaces of the prism may contain different compositions and the transmissivity and reflectivity of the prism may vary according to the positional relationship (arrangement) between the prism and the detection unit 340, the beam reception unit 320 and the beam transmission unit 310.

Figure 7:
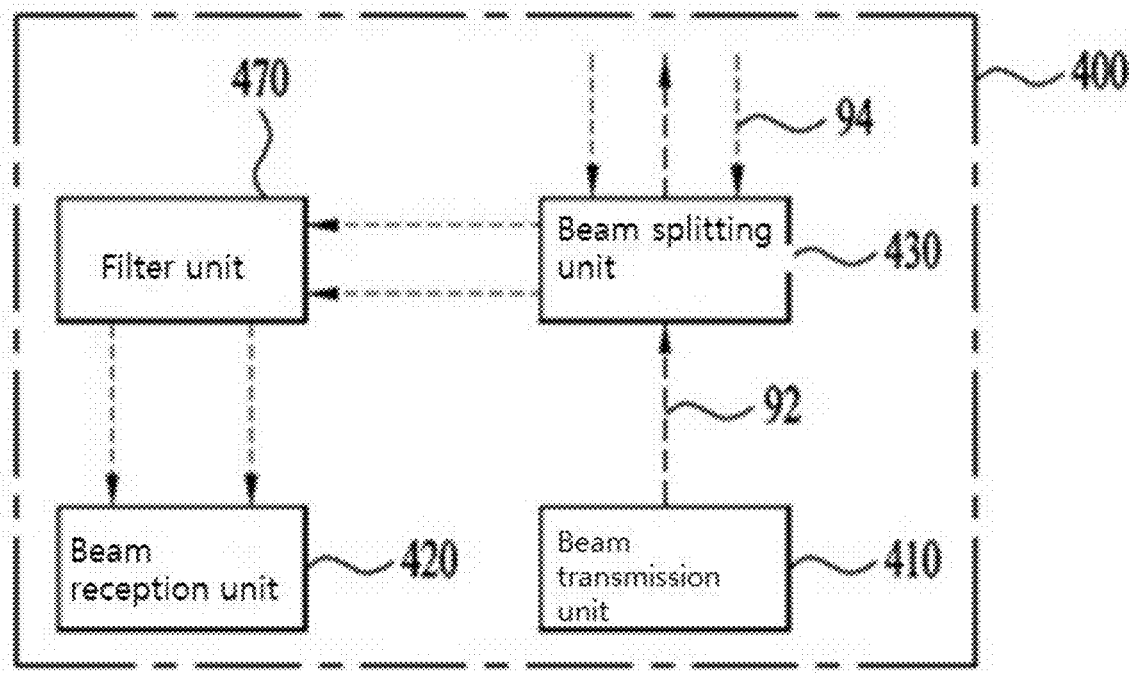
FIG. 7 illustrates a fourth optical device capable of performing detection and ranging using a laser.

FIG. 7 illustrates a fourth optical device 400 capable of performing detection and ranging using a laser.

As shown, the third optical device 400 may include a beam transmission unit 410 which generates a first beam 92 for photographing a specific region 90 (refer to FIGS. 2, 5 and 6), a beam reception unit 420 which senses a second beam 94 reflected from the specific region 90, a beam splitting unit 430 for separately transferring the first beam 92 and the second beam 94, and a filter unit 470 for removing noise from the second beam 94 delivered from the beam splitting unit 430 and transferring the noise-removed second beam 94 to the beam reception unit 420.

Although not shown, the fourth optical device 400 may further include the detection unit, reflector, QWP and the like included in the first to third optical devices 100, 200 and 300 (refer to FIGS. 2, 5 and 6).

Figure 8:
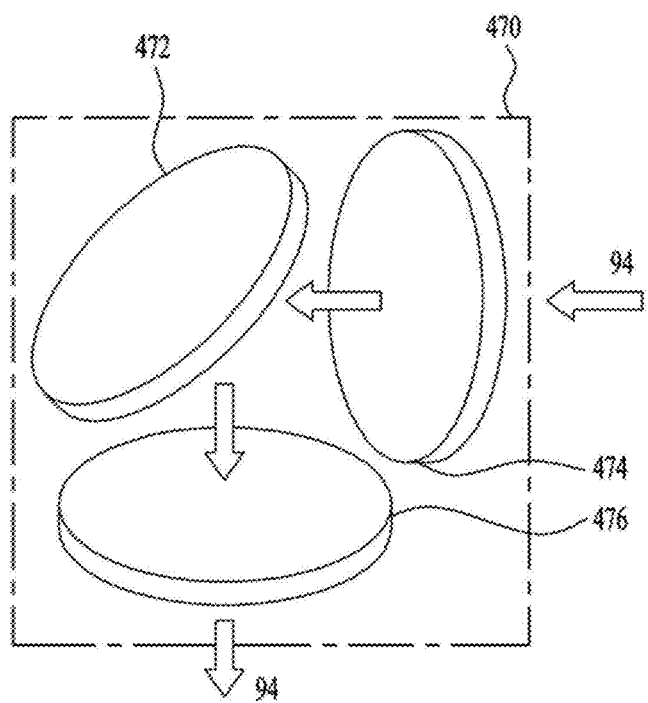
FIG. 8 illustrates a filter unit shown in FIG. 7.

FIG. 8 illustrates the filter unit 470 shown in FIG. 7.

As shown, the filter unit 470 may include at least one of a lens filter 474 which selectively absorbs a predetermined wavelength region of the second beam 94 to change the spectral distribution of the second beam 94 and transferring the second beam 94, a reflection filter 472 which selectively reflects the predetermined wavelength region of the second beam 94, and a penetration filter 476 which selectively transmits the predetermined wavelength region of the second beam 94. Although it is easier to remove noise from the second beam 94 as the number of used filters increases, the number of filters may be changed according to operation requirements and inside design of the optical device.

The incidence angles of the lens filter 474 and the penetration filter 476 may be 0 degrees and the incidence angle of the reflection filter 472 may be 45 degrees.

The surface curvature of one side of the lens filter 474 may be −50 mm and that of the other side may be 30 mm. The surfaces of the reflection filter 472 and the penetration filter 476 may be flat.

The lens filter 474, the reflection filter 472 and the penetration filter 476 may include a plurality of thin films.

Figure 9:
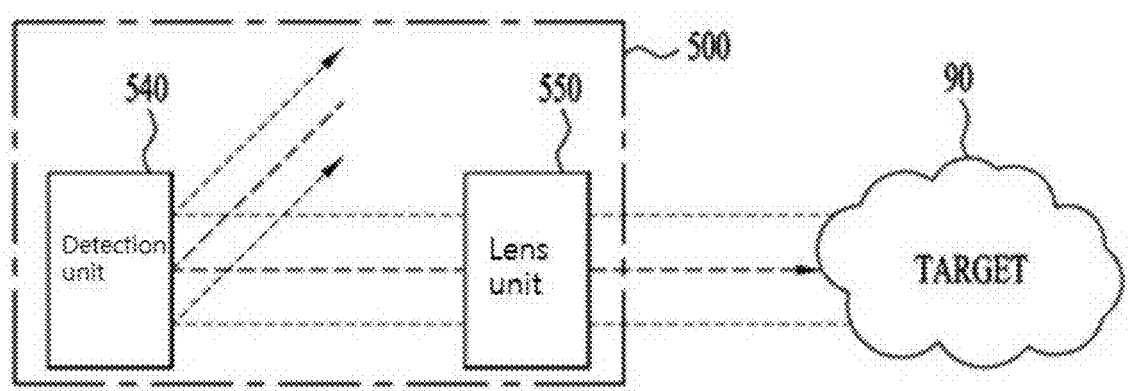
FIG. 9 illustrates a fifth optical device capable of performing detection and ranging using a laser.

FIG. 9 illustrates a fifth optical device 500 capable of performing detection and ranging using a laser.

As shown, the fifth optical device 500 includes a detection unit 540 and a lens unit 550. Although not shown, the fifth optical device 500 may further include the beam transmission unit, beam reception unit, beam splitting unit and the like included in the first to fourth optical devices 100, 200, 300 and 400 (refer to FIGS. 2, 5, 6 and 7).

The lens unit 550 may include at least one lens or a combination of at least one leans and a mirror. The lens unit 550 may readjust a first steering angle of the detection unit 540 in the range of 0 to ±100 degrees. For example, when the first steering angle of the detection unit 540 is 25 degrees, the lens unit 550 can readjust the first steering angle to 100 degrees (about four times the first steering angle). When the first steering angle of the detection unit 540 is 0 degrees, the lens unit 550 may maintain the first steering angle.

The performance and structure of the lens unit 550 may vary according to the purpose of use and required performance of the optical device 500. As factors determining the performance of the lens unit 550, field of view (FOV), uniformity of angle, beam divergence angle, etc. can be exemplified. For example, the lens unit 550 may be designed to have an FOV of 120 degrees. When the lens unit 550 is configured using multiple lenses, it is possible to easily satisfy requirements (i.e., FOV) of the optical device 500 as compared to a case in which the lens unit 550 is configured using a single lens.

Figure 10:
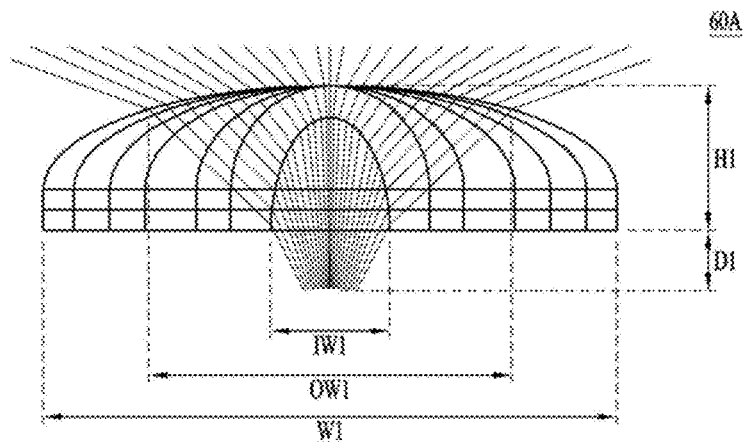
FIG. 10 illustrates a first lens structure applicable to the fifth optical device shown in FIG. 9.

FIG. 10 illustrates a first lens structure 60A applicable to the fifth optical device 500 shown in FIG. 9.

As shown, the first lens structure 60A may include a single lens having a width W1 of 20 mm and a height H1 of 5 mm. The width IW1 of an incident part to which beams are input is 5 mm and the width OW1 of an emission part through which beams are output is 14 mm. The distance D1 between the first lens structure 60A and a beam steering unit (not shown) (the distance between a beam emission point and the incident part of the lens) is 2 mm. The first lens structure 60A is characterized by uniformity of angle of 60%, FOV of 120 degrees and a beam divergence angle of 4 to 7 degrees. Application of the first lens structure 60A having a single lens may be limited according to the purpose of use because the beam divergence angle thereof is relatively wide.

Although the first lens structure 60A is configured using a single lens, the first lens structure 60A can readjust the first steering angle of the beam steering unit in the range of 0 to ±100 degrees. The value obtained by dividing the incidence angle of the first lens structure 60A by the refraction angle thereof on the basis of the optical axis of a third beam input to the beam steering unit may be in the range of 0.1 to 100.

Figure 11:
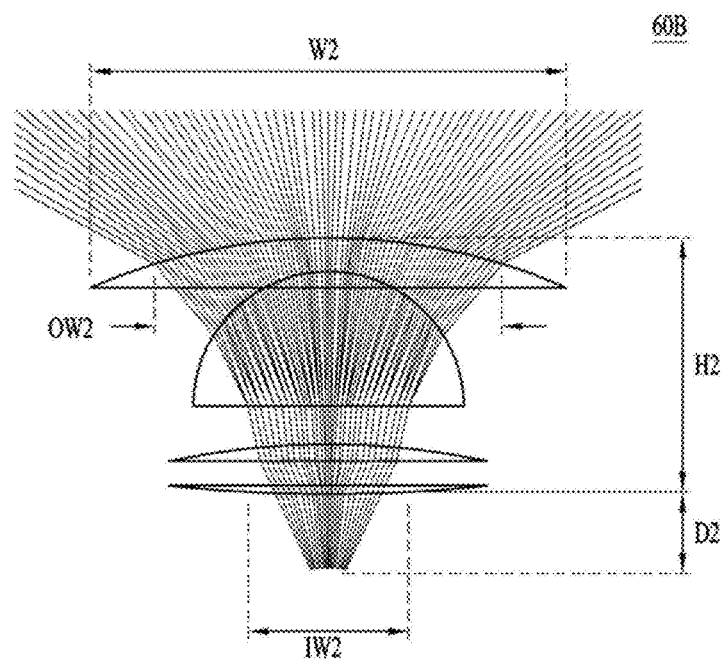
FIG. 11 illustrates a second lens structure applicable to the fifth optical device shown in FIG. 9.

FIG. 11 illustrates a second lens structure 60B applicable to the fifth optical device 500 shown in FIG. 9.

As shown, the second lens structure 60B may include a combination of a plurality of lenses, which has a width W2 of 32 mm and a height H2 of 15 mm. The width IW2 of an incident part to which beams are input is 8 mm and the width OW2 of an emission part through which beams are output is 23 mm. The distance D2 between the second lens structure 60B and a beam steering unit (not shown) (the distance between a beam emission point and the incident part of the lens combination) is 5 mm. The second lens structure 60B is characterized by uniformity of angle of 90%, FOV of 120 degrees and a beam divergence angle of 3.4 to 4.7 degrees.

Although the second lens structure 60B is configured using two lenses, the second lens structure 60B can readjust the first steering angle of the beam steering unit in the range of 0 to ±100 degrees. The value obtained by dividing the incidence angle of the first lens structure 60A by the refraction angle of the second lens structure 60B on the basis of the optical axis of a third beam input to the beam steering unit may be in the range of 0.1 to 100.

Figure 12:
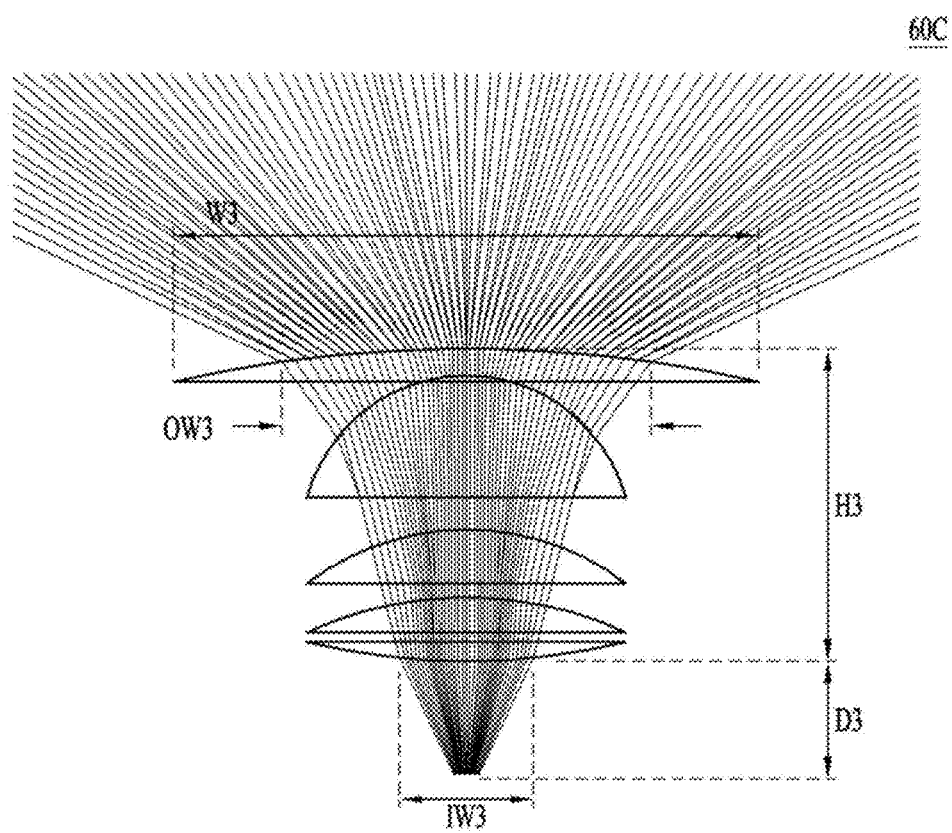
FIG. 12 illustrates a third lens structure applicable to the fifth optical device shown in FIG. 9.

FIG. 12 illustrates a third lens structure 60C applicable to the fifth optical device 500 shown in FIG. 9.

As shown, the third lens structure 60C may include a combination of a plurality of lenses, which has a width W3 of 45 mm and a height H3 of 25 mm. The width IW3 of an incident part to which beams are input is 14 mm and the width OW3 of an emission part through which beams are output is 32 mm. The distance D3 between the third lens structure 60C and a beam steering unit (not shown) (the distance between a beam emission point and the incident part of the lens combination) is 8 mm. The third lens structure 60C is characterized by uniformity of angle of 90%, FOV of 120 degrees and a beam divergence angle of 0.4 to 3.4 degrees.

Although the third lens structure 60C is configured using three lenses, the third lens structure 60C can readjust the first steering angle of the beam steering unit in the range of 0 to ±100 degrees. The value obtained by dividing the incidence angle of the first lens structure 60A by the refraction angle of the third lens structure 60C on the basis of the optical axis of a third beam input to the beam steering unit may be in the range of 0.1 to 100.

A single lens, a combination of multiple lenses and a combination of multiple lenses and an aperture included in the lens unit 550 (refer to FIG. 9) may be changed according to the purpose of use, requirements and degree of integration of the optical device 500 (refer to FIG. 9). For example, when the lens unit is configured using a combination of multiple lenses, the beam input region and the beam output region of the lens unit can be widened compared to a case in which a single lens is used. Accordingly, the lens unit can increase the range within which the steering angle of beams output from the detection unit 540 (refer to FIG. 9) can be increased.

Figure 13:
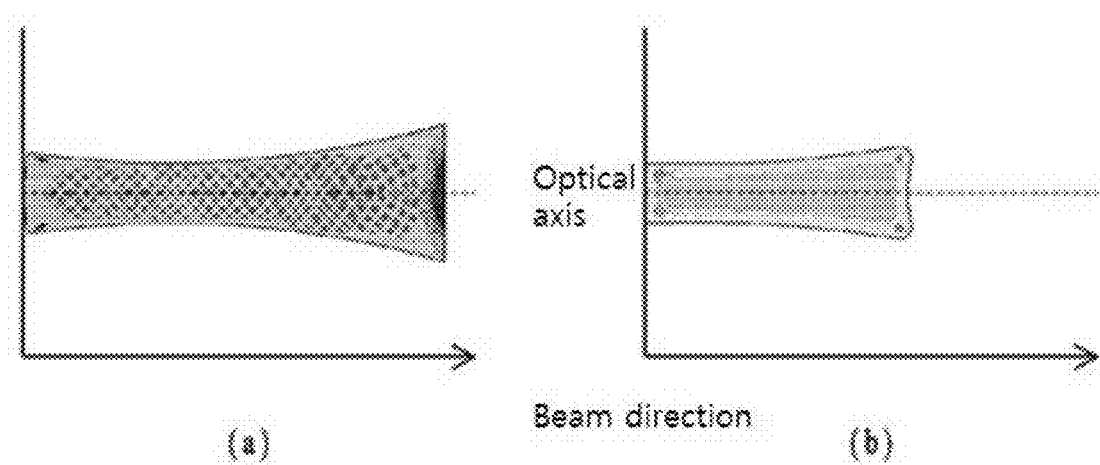
FIG. 13 illustrates effects of the third lens structure of FIG. 12.

FIG. 13 illustrates effects of the third lens structure 60C of FIG. 12. Specifically, FIG. 13(a) illustrates a case in which the fifth optical device 500 includes the third lens structure 60C and FIG. 13(b) illustrates a case in which the fifth optical device 500 does not include the additional lens unit 450.

By comparing FIG. 13(a) with FIG. 13(b), it can be seen that emission efficiency varies according to whether the optical device includes the lens structure when the same light source is used. In addition, the beam output region and an area that can be scanned by the optical device can be widened when the lens unit 550 is used.

The above-described optical device employs LiDAR (Light Detection And Ranging) and can radiate a laser pulse and measure an arrival time of a reflected laser pulse to calculate spatial coordinates of the reflection point and extract 3-dimensional information. Accordingly, when the optical device is used, a correct digital elevation model (DEM) of a building or a geographic feature can be generated because reflection time differs according to characteristics of objects. In addition, it is possible to rapidly and efficiently generate a 3-dimensional model by automatically constructing a building layer combined with high-definition images, acquiring information that is difficult to obtain from an optical image, separately generating DEMs of geographical features and DEMs of buildings and structures using acquired high-accuracy DEMs and combining the DEMs using the optical device. Furthermore, the optical device can be set in a vehicle and applied to a system for extracting 3-dimensional spatial information such as DEMs of roads, lanes, street furniture and the like and thus can be efficiently used for automatic operation systems for vehicles and acquisition of accurate DEMs of a downtown area and roads.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Thus, the above embodiments are to be considered in all respects as illustrative and not restrictive. The scope of the invention should be determined by reasonable interpretation of the appended claims and all change coming within the equivalent scope of the invention are included in the scope of the invention.

Mode for Invention

A mode for the invention has been sufficiently described in the above-described "Best Mode".

INDUSTRIAL APPLICABILITY

It is possible to rapidly and efficiently generate a 3-dimensional model by automatically constructing a building layer combined with high-definition images, acquiring information that is difficult to obtain from an optical image, separately generating DEMs of geographical features and DEMs of buildings and structures using acquired high-accuracy DEMs and combining the DEMs using the optical device according to embodiments. Furthermore, the optical device can be set in a vehicle and applied to a system for extracting 3-dimensional spatial information such as DEMs of roads, lanes, street facility and the like and thus can be efficiently used for automatic operation systems for vehicles and acquisition of accurate DEMs of a downtown area and roads.

The invention claimed is:

1. An optical device comprising:
   a beam transmitter configured to generate a first beam for photographing a certain area;
   a beam receiver configured to sense a second beam returning from the certain area;
   a beam splitter configured to separately transmit the first beam and the second beam;
   a detector including a micro electro-mechanical system (MEMS) mirror for changing the optical axis of the first beam by a first steering angle, transmitting the first beam having the changed optical axis and receiving the second beam;
   a quarter-wave plate (QWP) positioned between the beam splitter and the detector to prevent scattering of the first beam and the second beam; and
   a reflector positioned between the QWP and the beam splitter.

2. An optical device comprising:
   a beam transmitter configured to generate a first beam for photographing a certain area;
   a beam receiver configured to sense a second beam returning from the certain area;
   a beam splitter configured to separately transmit the first beam and the second beam; and
   a detector including a micro electro-mechanical system (MEMS) mirror for changing the optical axis of the first beam by a first steeling angle transmitting the first beam having the changed optical axis and receiving the second beam,
   wherein the beam splitter comprises:
      an aperture formed at the center of the beam splitter to pass the first beam the first beam through the beam splitter; and
      a reflecting part provided at the edge of the light beam splitter to reflect the second beam.

3. The optical device according to claim 2, wherein the size of the aperture is greater than the size of a beam spot of the first beam, the aperture passes at least 50% of the first beam therethrough, and the reflecting part is three or four times larger than the MEMS mirror.

4. The optical device according to claim 1, wherein the beam splitter includes a prism for reflecting the first beam and the second beam at different reference surfaces and transferring the reflected first and second beams to the detector and the beam receiver.

5. The optical device according to claim 4, wherein the prism comprises:
   a first reflecting surface for reflecting the first beam and transmitting the second beam;
   an absorbing surface for absorbing some of the first beam passed through the first reflecting surface;
   a second reflecting surface for reflecting the second beam passed through the first reflecting surface; and
   a penetration surface for transmitting the second beam reflected by the second reflecting surface.

6. The optical device according to claim 1, comprising at least one reflector positioned between the beam transmitter, the beam receiver, the beam splitter and the detector to transfer the first beam or the second beam.

7. An optical device comprising:
   a beam transmitter configured to generate a first beam for photographing a certain area;
   a beam receiver configured to sense a second beam returning from the certain area;
   a beam splitter configured to separately transmit the first beam and the second beam; and
   a detector including a micro electro-mechanical system (MEMS) mirror for changing the optical axis of the first beam by a first steering angle, transmitting the first beam having the changed optical axis and receiving the second beam; and
   a quarter-wave plate (QWP) positioned between the beam splitter and the detector to prevent scattering of the first beam and the second beam,
   wherein the beam transmitter comprises:
      a collimation lens for collimating the first beam transferred from a light source device; and
      an optical phase array for dispersing the collimated first beam to generate the first beam.

8. The optical device according to claim 7, wherein the first beam is a laser having a wave front diameter or major axis length in the range of 100 nm to 2 mm.

9. The optical device according to claim 7, wherein the optical phase array is composed of elements in an m×n matrix (m and n being natural numbers equal to or greater than 3, m×n≥k), the elements being distributed in the form of a discrete space with respect to a plurality of direction vectors.

10. The optical device according to claim 9, wherein, when the elements have a spherical surface, the absolute value of the curvature of the spherical surface is greater than 10 mm, and when the elements have an uneven surface, the height of the unevenness is less than 1 mm.

11. The optical device according to claim 9, wherein the elements have a size of more than 1.5 times the wave surface of the first beam and a refractive index in the range of 1 to 2.7.

12. The optical device according to claim 9, wherein the value obtained by dividing the size of the beam spot of a beam output from the elements by a beam spot spacing is equal to or less than 0.5.

13. The optical device according to claim 1, further comprising a controller for rotating the MEMS mirror to adjust the first steering angle.

14. An optical device comprising:
   a beam transmitter configured to generate a first beam for photographing a certain area;
   a beam receiver configured to sense a second beam returning from the certain area;
   a beam splitter configured to separately transmit the first beam and the second beam;
   a detector including a MEMS mirror for changing the optical axis of the first beam by a first steering angle, transmitting the first beam having the changed optical axis and receiving the second beam; and
   a filter configured to remove noise of the second beam transferred from the beam splitter and to transfer the second beam to the beam receiver,
   wherein the beam splitter includes an aperture formed at the center of the beam splitter for passing the first beam through the beam splitter.

15. The optical device according to claim 14, wherein the filter includes at least one of: a lens filter for selectively absorbing a predetermined wavelength region of the second beam to change spectral distribution of the second beam and transferring the second beam; a reflection filter for selectively reflecting the predetermined wavelength region of the second beam; and a penetration filter for selectively transmitting the predetermined wavelength region of the second beam.

16. The optical device according to claim 15, wherein the at least one of the lens filter, the reflection filter and the penetration filter includes a plurality of thin films.

17. An optical device comprising:
a beam transmitter configured to generate a first beam for photographing a certain area;
a beam receiver configured to sense a second beam returning from the certain area;
a beam splitter configured to separately transmit the first beam and the second beam;
a detector including a MEMS mirror for changing the optical axis of the first beam by a first steering angle, transmitting the first beam having the changed optical axis and receiving the second beam; and
a lens assembly including one or more lenses and a mirror and for readjusting the steering angle in the range of 0 to ±100,
wherein the beam splitter includes an aperture formed at the center of the beam splitter for passing the first beam through the beam splitter.

18. The optical device according to claim 17,
wherein the lenses have a size of more than twice a beam spot of the second beam, and
wherein the aperture is more than 50% larger than the beam spot of the second beam.

19. The optical device according to claim 17, wherein the value obtained by dividing an incidence angle of the lens assembly by a refraction angle of the lens assembly on the basis of the optical axis of the second beam is in the range of 0.1 to 100.

20. The optical device according to claim 7, wherein a wave front of the first beam output from the optical phase array is wider than the area obtained by dividing the area of the wave front of the collimated first beam by k, wherein k is the number of first beams.

* * * * *